United States Patent [19]

Eby

[11] 4,428,260
[45] Jan. 31, 1984

[54] METHOD OF FORMING A CUTTING EDGE
[75] Inventor: Richard R. Eby, Ephrata, Pa.
[73] Assignee: Sperry Corporation, New Holland, Pa.
[21] Appl. No.: 353,464
[22] Filed: Mar. 1, 1982
[51] Int. Cl.³ .................. B21K 19/00; B21K 11/00
[52] U.S. Cl. .................... 76/104 R; 76/101 R; 172/747
[58] Field of Search ......... 76/101 R, 104 R, DIG. 11, 76/104 A; 172/747; 56/500, 249, 294

[56] References Cited
U.S. PATENT DOCUMENTS 1,669,088  5/1928  Johnson ........................... 76/101 R
1,950,355  3/1934  DeBats ......................... 76/DIG. 11

OTHER PUBLICATIONS

Sperry-New Holland Brochure No. 31190020-7-81, p. 6, "Self-Propelled Harvesters 1900, 2100".

Primary Examiner—Roscoe V. Parker
Attorney, Agent, or Firm—Frank A. Seemer; Larry W. Miller; Darrell F. Marquette

[57] ABSTRACT

A shearbar is formed of a first material. A groove is formed in an upper surface of the bar and is filled with a second material relatively harder than the first material. A side surface is then milled off the bar until the groove is exposed. As a result, a shear edge of the bar is formed of the harder material rather than having only an outer coating of harder material.

5 Claims, 7 Drawing Figures

STEP 1
Machine groove in bar

STEP 2
Plasma arc welding titanium carbide in second portion of groove

STEP 3
Plasma arc welding titanium carbide in first portion of groove

STEP 4
Milling off one side adjacent the groove until groove is exposed

STEP 5
Grinding the milled side to form a sharp corner with the upper surface

STEP 1

Machine groove in bar

STEP 2

Plasma arc welding titanium carbide in second portion of groove

STEP 3

Plasma arc welding titanium carbide in first portion of groove

STEP 4

Milling off one side adjacent the groove until groove is exposed

STEP 5

Grinding the milled side to form a sharp corner with the upper surface

METHOD OF FORMING A CUTTING EDGE

BACKGROUND OF THE INVENTION

This invention relates generally to metal working processes for manufacturing agricultural devices and, more particularly, to a shearbar forming a mating cutting surface with the knives of a rotary cutterhead used in forage harvesters.

Presently known shearbars form a scissor-like cutting edge in cooperation with the well known knives of rotary cutterheads in forage harvesters. In time, the shear edge of the shearbar wears down and must be replaced. This occurs due to the composition of the shearbar which is usually a carbon steel alloy.

The shear edges of shearbars have been successfully coated with a tungsten carbide coating of from about 0.008 inches in thickness to about 0.012 inches in thickness. While such coated edges do increase wear life, once the wear has extended through the coating, wear then accelerates since the base material (carbon steel) of the blade is exposed. Thus, there are wear limitations of both the uncoated and coated shearbars.

The foregoing illustrates limitations of the known prior art. Thus, it is apparent that it would be advantageous to provide an alternative directed to overcoming one or more of the limitations as set forth above. Accordingly, a suitable alternative is to provide a shearbar which retains a sharp shearing edge for extended wear life.

SUMMARY OF THE INVENTION

In one aspect of the present invention, this is accomplished by providing a method of forming a long wearing shear edge on a shearbar formed of a first material comprising the steps of machining a groove in an upper surface of the bar; plasma arc welding a relatively harder second material in the groove; and milling off one side of the bar to expose the groove. The groove has a common arcuate surface with the bar.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
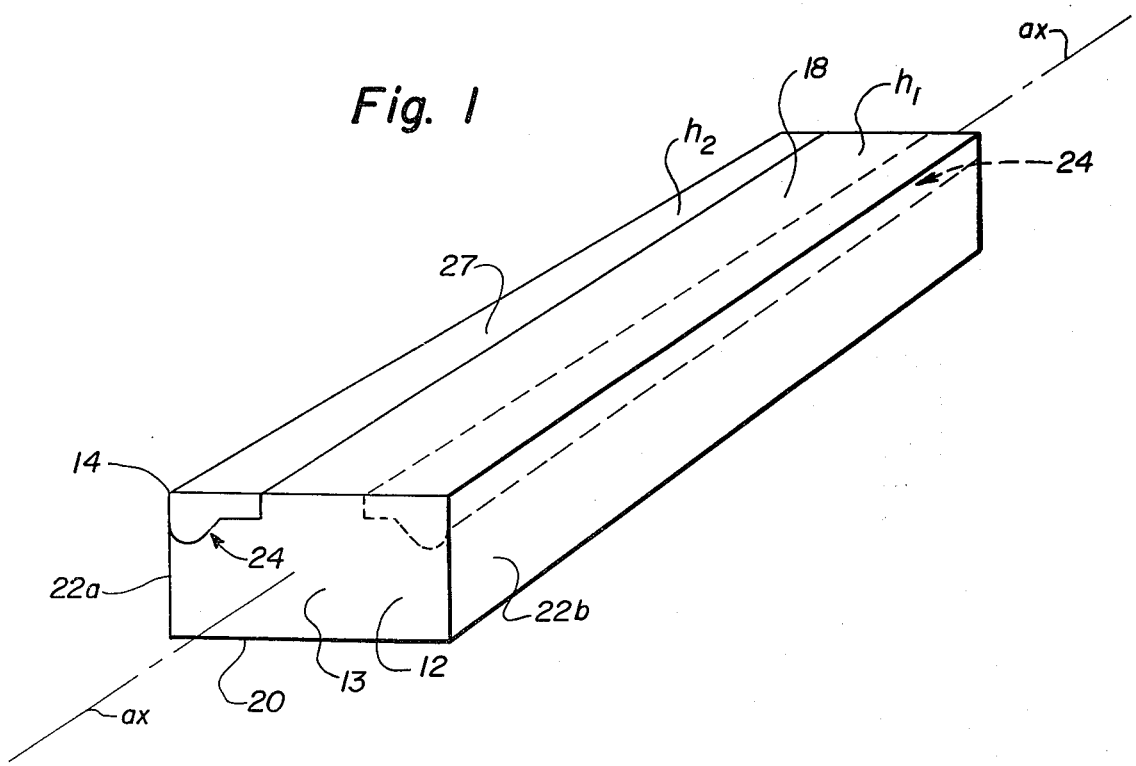
FIG. 1 is an isometric view illustrating an embodiment of the shearbar of this invention.

A finished shearbar 12, FIG. 1, is a bar of a first material 13 such as steel, preferably AISI 1030 having a hardness $h_1$ of about $R_B 70$. Bar 12 has an elongated axis designated ax and a substantially rectangular cross-section including an upper surface 18, a lower surface 20 and a pair of side surfaces 22a, 22b. Upper surface 18 and one of the side surfaces 22a converge to form shear edge 14.

Figure 2:
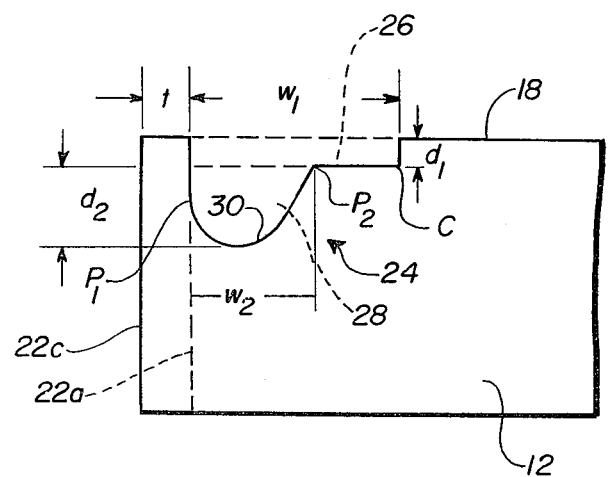
FIG. 2 is an end view illustrating an embodiment of a blank of the shearbar of this invention prior to filling the groove with a hard material.

A groove 24 is formed in a blank bar 12 (FIG. 2) by well known machining methods. Groove 24 has a first portion 26 and a second portion 28. First portion 26 has a first width $w_1$ of about 0.90 inches, and a first depth $d_1$ of about 0.30 inches. Second portion 28 has a second width $w_2$ of about 0.25 inches and a second depth $d_2$ of about 0.16 inches. First portion 26 is of a rectangular cross-section whereas second portion 28 shares a common surface 30 with bar 12 extending from a point $P_1$ to a point $P_2$, the common surface 30 being an arcuate surface.

Groove 24 contains a second material 27, preferably titanium carbide, having a hardness $h_2$ of about $R_c 50$. The titanium carbide is applied by a well known plasma arc welding process. The titanium carbide preferred is a commercially available product; such as, for example, the product TiCOAT, T-92, of Metallurgical Industries, Tinton Falls, N.J.

Groove 24, FIG. 2a, is machined in upper surface 18 of bar 12 so as to extend in the direction of axis ax. Groove 24 is formed adjacent to and spaced from a side 22c at a thickness t of about 0.25 inches.

Figure 3A:
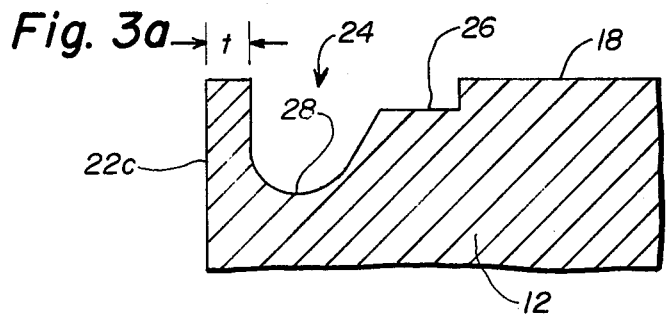
FIGS. 3a-e illustrate steps in a method for forming an embodiment of the shearbar of this invention.
Figure 3B:
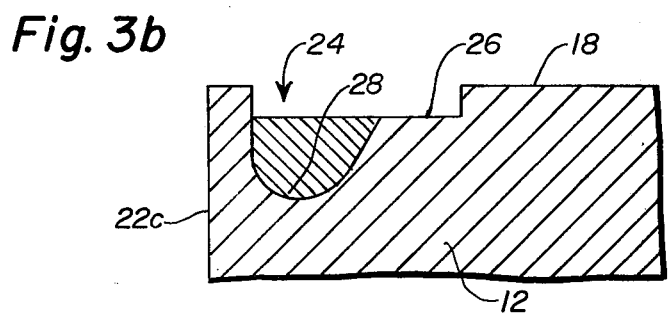
Figure 3C:
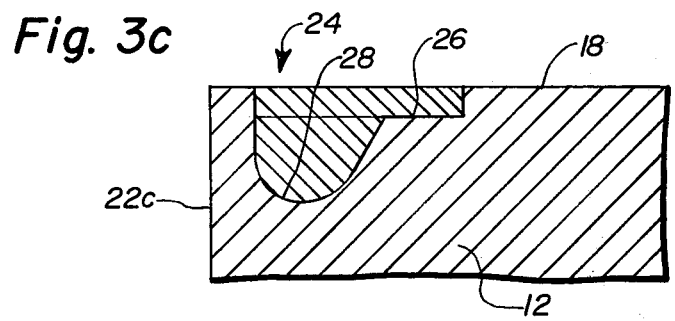

The well known plasma arc welding process is used, FIG. 3b, to first fill second portion 28 of groove 24 with the titanium carbide. Subsequently, and preferably after the material in second portion 28 is cooled, the same plasma arc welding process is again used, FIG. 3c, to fill first portion 26 of groove 24 with titanium carbide.

Figure 3D:
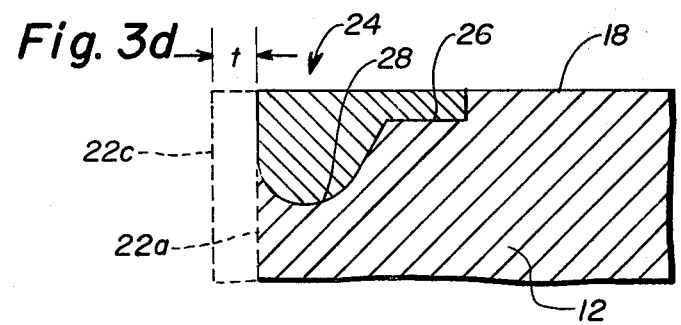
Figure 3E:
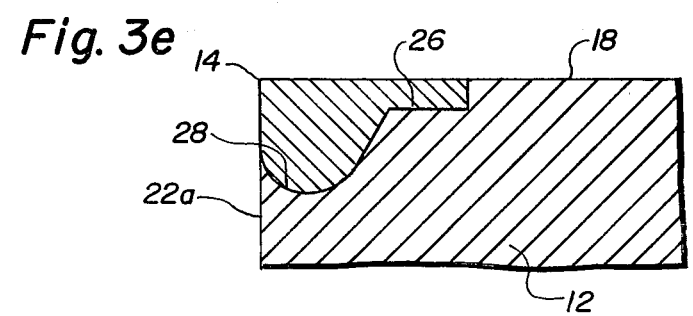

After all of the titanium carbide has cooled, side 22c is milled off, FIG. 3d, until thickness t diminishes and exposes groove 24 and the titanium carbide to milled side 22a. Finally, FIG. 3e, a brief grinding operation is used on side 22a to form a sharp corner of titanium carbide at shear edge 14, where side 22a converges with upper surface 18. As a result, a substantially long wearing shear edge 14a continues to expose titanium carbide as wear occurs.

It is of utmost importance that second portion 28 and shearbar 12 share common arcuate surface 30 because during the welding process, extremely high fusion temperatures are present and overheating of surface 30 can be avoided due to the arcuate surface. This is because molten titanium carbide will flow into the arcuate groove whereas a rectangular portion having corners requires prolonged heating in order to cause the titanium carbide to flow and fill corners thus avoiding unfilled pockets. Such prolonged heating could cause the carbon steel to dilute the titanium carbide and become alloyed while filling groove 24.

The thickness t provides a thickness of carbon steel 12 for taking away a sufficient amount of heat during the welding process. Hereagain, arcuate surface 30 is of benefit since prolonged heating of the carbon steel in the area of the thickness t can cause the resultant alloy of carbon steel and titanium carbide to extend into the area of the thickness t. Should this occur, then an extensive and expensive grinding operation could be required to diminish thickness t from surface 22c to surface 22a. It is not as critical to avoid a corner such as corner c (FIG. 2) in first portion 26 since there are no surface milling or grinding operations in that area. Also, it is possible, if desired, to form a bar 12 having two grooves 24 (FIG. 1) filled with titanium carbide so that bar 12 can be reversed.

The foregoing has described a method of making a shearbar which retains a sharp edge for extended wear life.

It is anticipated that aspects of the present invention, other than those specifically defined in the appended claims, can be obtained from the foregoing description and the drawings.

Having thus described the invention, what is claimed is:

1. A method of forming a long wearing shear edge on a shearbar comprising the steps of:

machining a groove in a shearbar of a first material having a hardness $h_1$, said bar having an elongated axis and having a substantially rectangular cross section including an upper and lower surface and a pair of side surfaces, said groove being formed in the direction of said axis in said upper surface adjacent to and spaced from one of said side surfaces at a thickness t, said groove having a common arcuate surface with said bar;

using a plasma arc welding process, filling said groove with a second material having a hardness $h_2$, where $h_2 > h_1$;

milling off said one side surface adjacent said groove until said thickness t diminishes and exposes said groove; and grinding said milled side for forming a sharp corner with said upper surface.

2. The method of claim 1 wherein said first material is steel and said second material is titanium carbide.

3. The method of claim 1 wherein said groove has first and second portions, said first portion having a first width $w_1$ and a first depth $d_1$, where $w_1 > d_1$, said second portion having a second width $w_2$ and a second depth $d_2$, where $w_2 < w_1$.

4. The method of claim 3 wherein said second groove portion is filled with said second material and then said first groove portion is filled with said second material.

5. The method of claim 1 wherein said first material is steel and said second material is tungsten carbide.

* * * * *